(No Model.)
F. F. LANDIS.
STEERING GEAR FOR TRACTION ENGINES.
No. 533,132. Patented Jan. 29, 1895.
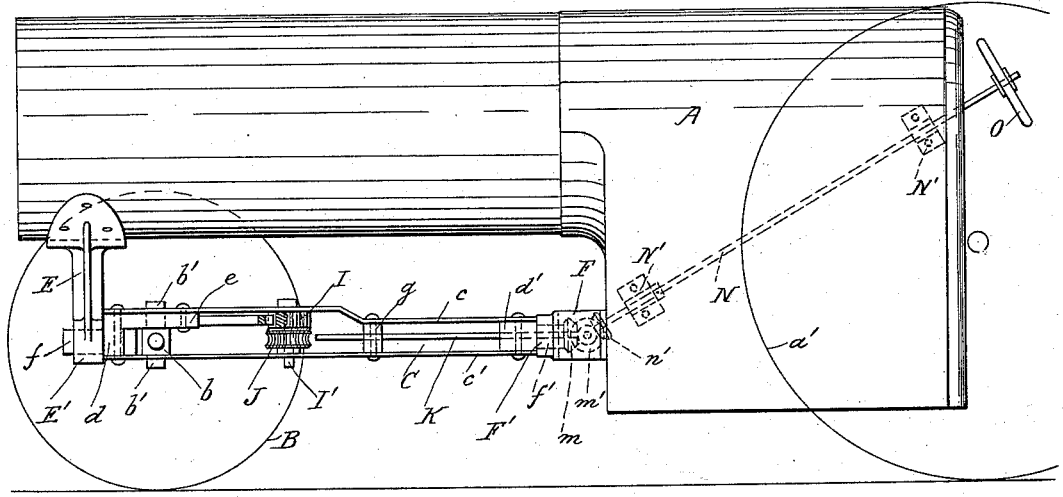
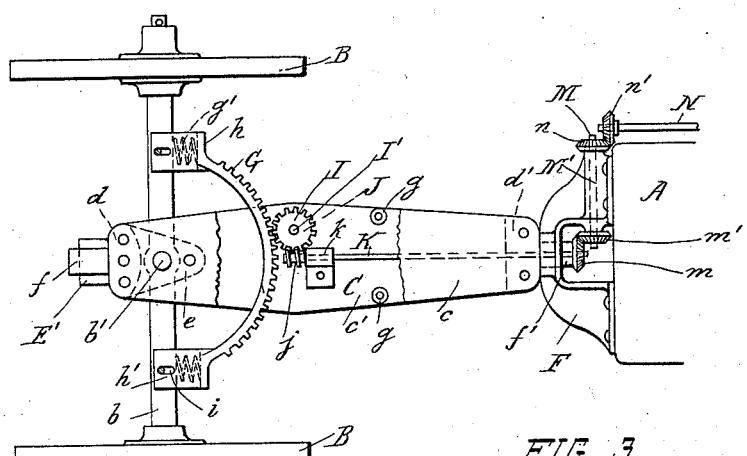
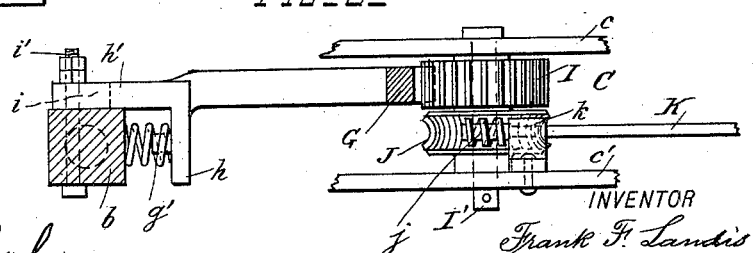
WITNESSES:
INVENTOR
Frank F. Landis.
BY
Herbert W. T. Jenner.
ATTORNEY.

UNITED STATES PATENT OFFICE.

FRANK F. LANDIS, OF WAYNESBOROUGH, PENNSYLVANIA.

STEERING-GEAR FOR TRACTION-ENGINES.

SPECIFICATION forming part of Letters Patent No. 533,132, dated January 29, 1895.

Application filed November 23, 1894. Serial No. 529,708. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Steering-Gear for Traction-Engines; and I do hereby declare the following to be a full, clear, and exact description of the invention, such as will enable others skilled in the art to which it appertains to make and use the same.

This invention relates to the mechanism used for steering traction engines; and it consists in the novel construction and combination of the parts hereinafter fully described and claimed.

In the drawings: Figure 1 is a side view of a portion of a traction engine provided with steering gear according to this invention. Fig. 2 is a plan view of the steering gear. Fig. 3 is a side view of a portion of the gear, drawn to a larger scale.

A is the boiler of a traction engine, and the circle $a'$ indicates the position of the driving wheels which are mounted on an axle extending across the front plate of the boiler, and the said driving wheels are constructed and actuated in any approved manner.

B are the steering wheels which are of any approved construction. The wheels B are journaled on the end of the axle $b$, which is provided with vertically-arranged pivots $b'$ at its center.

C is a frame consisting of two longitudinally-arranged upper and lower plates $c$ and $c'$ secured to a block $d$ at their front ends and to a block $d'$ at their rear ends. The block $d$ is provided with a flange $e$ at its upper part next to the plate $c$, and the pivots $b'$ are journaled in holes in the said flange $e$ and in the lower plate $c'$. The front block $d$ is provided with a pivot $f$, and the rear block $d'$ with a pivot $f'$, and the two pivots are arranged horizontally and in line with each other.

E is a standard secured to the under side of the barrel of the boiler and provided with a bearing E' in which the front pivot $f$ of the frame C is journaled.

F is a bracket secured to the throat sheet of the boiler under the barrel, and provided with a bearing F' in which the rear pivot $f'$ of the frame C is journaled. The upper plate of the frame may be flat or it may have an offset portion as shown in the drawings; and the frame may be provided with distance pieces $g$ to make it stiff and rigid.

G is a toothed segment secured to the axle $b$ concentric with the pivots $b'$. The ends of the segment may be rigidly secured to the axle, or, if desired, springs $g'$ may be interposed between the axle and the flanges $h$ on the ends of the segment to avoid the risk of the teeth of the segment being broken when either wheel strikes a large stone or other obstruction. When the springs $g'$ are used, the flanges $h'$ on the ends of the segment may have elongated holes $i$ for the bolts $i'$ which pass through them and secure the segment to the axle, or the ends of the segment may be slidably connected to the axle in any other approved manner.

I is a toothed pinion journaled on the pin I' which is arranged vertically in the frame C; and J is a worm wheel journaled on the said pin and secured to the pinion I. The pinion I gears into the segment G. A worm $j$ gears into the worm wheel J, and is secured upon one end of an operating shaft K. The shaft K is arranged concentric with the pivots $f$ and $f'$ of the frame C. The front end of the shaft K is journaled in the bracket $k$ secured between the plates of the frame, and its rear end is journaled in the rear pivot $f'$.

The steering of the engine is effected by revolving the shaft K, thereby turning the axle $b$ on its vertical pivots through the worm, worm wheel, toothed pinion and segment. The friction of the worm and worm wheel prevents the axle from moving when the shaft K is not revolved, and the frame C is always free to oscillate on its pivots $f f'$ so that the wheels may adapt themselves to inequalities of the road.

The shaft K may be revolved by any approved driving mechanism. A convenient arrangement of mechanism for this purpose consists of a beveled toothed wheel $m$ secured on the end of the shaft K and gearing into a beveled toothed wheel $m'$ secured on the end of a shaft M, journaled in a bearing M' on the bracket F, and extending to the side of the boiler. A beveled toothed wheel $n$ is secured on the end of the shaft M, and $n'$ is a beveled toothed wheel gearing into the wheel $n$ and secured on the end of a shaft N. The shaft N is journaled in brackets N' secured to the side of the boiler, and O is a hand wheel secured on the rear end of the shaft N, where it can conveniently be operated.

What I claim is—

1. The combination, with bearings carried by the traction engine, of a longitudinally-arranged frame pivoted horizontally between the said bearings, a steering axle provided with road wheels and pivoted vertically in the said frame, an operating shaft journaled in the rear end pivot of the said frame, and driving mechanism operatively connecting the said shaft with the said axle, substantially as set forth.

2. The combination, with the horizontally-pivoted supporting frame, and the steering axle pivoted vertically in the said frame; of a toothed segment slidably connected to the said axle, springs interposed between the ends of the said segment and the axle, an operating shaft journaled in the rear end pivot of the said frame, and toothed gearing operatively connecting the said shaft with the said segment, substantially as set forth.

3. The combination, with the horizontally-pivoted supporting frame, and the steering axle pivoted vertically in the said frame; of a toothed segment secured to the said axle, a toothed pinion and a worm wheel carried by the frame, said pinion gearing into the said segment; an operating shaft journaled in the rear end pivot of the frame, and a worm secured on the said shaft and gearing into the said worm wheel, substantially as and for the purpose set forth.

In testimony whereof I affix my signature in presence of two witnesses.

FRANK F. LANDIS.

Witnesses:
HARRY C. SHANK,
ALF. N. RUSSELL.